May 13, 1930.  C. C. ABBOTT  1,758,815

SELF CONTAINED HEATED DEVICE

Filed Aug. 16, 1923

Inventor:
Charles C. Abbott,
by
His Attorney.

Patented May 13, 1930

1,758,815

UNITED STATES PATENT OFFICE

CHARLES C. ABBOTT, OF PITTSFIELD, MASSACHUSETTS, ASSIGNOR TO GENERAL ELECTRIC COMPANY, A CORPORATION OF NEW YORK

SELF-CONTAINED HEATED DEVICE

Application filed August 16, 1923. Serial No. 657,773.

My invention relates to self-contained heated devices and has for its object the provision of a method and means for dissipating heat generated in the device so as to prevent overheating when the device is not in use.

My invention has application to various self-contained heated devices wherein the heating means forms a part of the device itself, regardless of the particular type of heating means used whether gas, electricity, etc., although it has particular application to electrically heated devices.

In the operation of various kinds of electrically heated devices such as sad irons, soldering irons and the like, if the device is allowed to remain idle with the current turned on for a considerable period of time, it will heat up to such a temperature as to endanger its life and also to a temperature which is too high for efficient operation. This is a particular disadvantage if the device is being used intermittently, it being desired to have the device ready for use when required at the most efficient operating temperature. Various temperature control devices have been used for controlling the heating circuit. Such control devices, however, are expensive and also to some extent unreliable.

In carrying out my invention, I provide a stand upon which the device may be placed when not in use which is provided with means for receiving and dissipating heat from the device so as to maintain it at normal working temperature.

Figure 1:
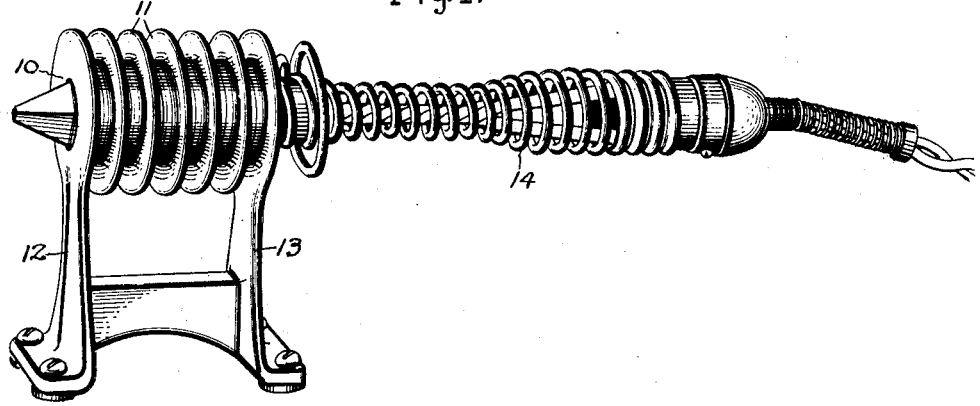
Figure 2:
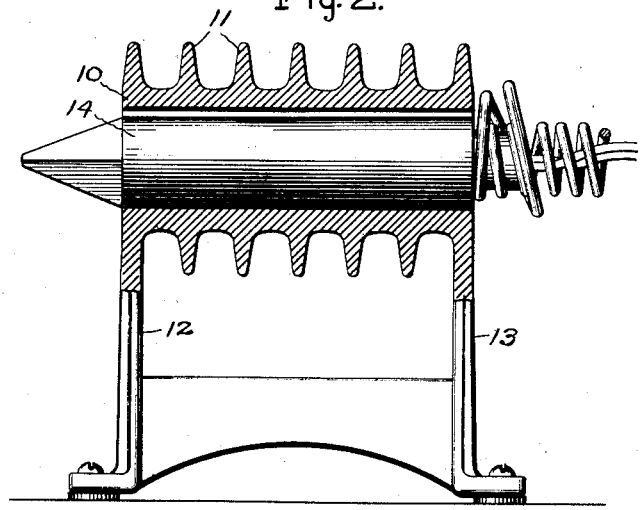

For a more complete understanding of my invention reference should be had to the accompanying drawing in which Fig. 1 is a perspective view of a stand for soldering irons embodying my invention showing a soldering iron resting thereon; while Fig. 2 is a vertical section view of Fig. 1.

Referring to the drawing, I have shown my invention in one form as applied to an electric soldering iron. Obviously, however, my invention may take various shapes and may be used in connection with various other electrically or otherwise heated devices, such as flat irons, curling irons and the like. In the particular form shown, the stand comprises a hollow cylindrical or tubular member 10 made of a suitable heat conducting material, such as cast iron, having circumferential heat radiating vanes or rings 11. The member 10 is supported on suitable legs 12 and 13.

In using the stand, the soldering iron 14 which may be of any electrically heated type is inserted in the tubular member 10 so that the heated part of the soldering iron is surrounded thereby, as shown in Fig. 2. The heat generated in the soldering iron is transmitted mainly by conduction and radiation to the member 10 from which it is dissipated to the surrounding air, the rate at which the heat is dissipated being increased by means of the vanes 11. Heat is dissipated at such rate that heat is received by the member 10 from the soldering iron at a rate approximately equal to the rate at which heat is given out by the soldering iron under actual working conditions, assuming that the soldering iron is designed to be maintained at the proper working temperature when in continuous use. In case the soldering iron is heated at a rate less than or greater than the rate at which heat is given off under normal working conditions, then the stand will be adapted to dissipate heat at a rate correspondingly less or greater, as the case may be. In any event the rate of transfer of heat from the soldering iron to the stand is such that the soldering iron is maintained at all times at the proper working temperature so that it is ready for instant use.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A cooling stand for electric soldering irons comprising a hollow heat conducting member into which the soldering iron is inserted when not in use, and heat dissipating means on said member arranged to receive heat from said iron at a rate having a predetermined ratio to the rate at which heat is generated in said iron so as to approximate actual working conditions.

2. A cooling stand for self-contained soldering irons comprising a hollow cylindrical member made of heat conducting material into which the soldering iron is inserted, and heat dissipating vanes on said member so arranged that heat is received from said iron at a rate having a predetermined ratio with respect to the rate at which heat is imparted to the soldering iron so as to approximate actual working conditions.

In witness whereof, I have hereunto set my hand this 10th day of August, 1923.

CHARLES C. ABBOTT.